(12) United States Patent
Lin et al.

(10) Patent No.: US 10,518,354 B2
(45) Date of Patent: Dec. 31, 2019

(54) ULTRAVIOLET LASER 3D PRINTING METHOD FOR PRECISE TEMPERATURE CONTROL OF POLYMER MATERIAL AND DEVICE THEREOF

(71) Applicants: INSTITUTE OF CHEMISTRY, CHINESE ACADEMY OF SCIENCES, Beijing (CN); INSTITUTE OF SEMICONDUCTORS, CHINESE ACADEMY OF SCIENCES, Beijing (CN)

(72) Inventors: Xuechun Lin, Beijing (CN); Wenting Wang, Beijing (CN); Zhiyan Zhang, Beijing (CN); Shusen Zhao, Beijing (CN); Haijuan Yu, Beijing (CN); Yongmei Ma, Beijing (CN); Wenhua Sun, Beijing (CN); Jian Xu, Beijing (CN); Jinyong Dong, Beijing (CN); Chuncheng Li, Beijing (CN); Wenxin Fu, Beijing (CN)

(73) Assignees: INSTITUTE OF CHEMISTRY, CHINESE ACADEMY OF SCIENCES, Beijing (CN); INSTITUTE OF SEMICONDUCTORS, CHINESE ACADEMY OF SCIENCES, Beijing (CN)

( * ) Notice: Subject to any disclaimer, the term of this patent is extended or adjusted under 35 U.S.C. 154(b) by 406 days.

(21) Appl. No.: 15/507,680

(22) PCT Filed: Apr. 24, 2015

(86) PCT No.: PCT/CN2015/077364
§ 371 (c)(1),
(2) Date: Feb. 28, 2017

(87) PCT Pub. No.: WO2015/165364
PCT Pub. Date: Nov. 5, 2015

(65) Prior Publication Data
US 2017/0259504 A1 Sep. 14, 2017

(30) Foreign Application Priority Data
Apr. 30, 2014 (CN) .......................... 2014 1 0181568

(51) Int. Cl.
*B33Y 10/00* (2015.01)
*B23K 26/364* (2014.01)
(Continued)

(52) U.S. Cl.
CPC ........ *B23K 26/064* (2015.10); *B23K 26/0613* (2013.01); *B23K 26/12* (2013.01);
(Continued)

(58) Field of Classification Search
CPC .... B33Y 10/10; B33Y 30/00; B23K 26/0624; B23K 26/064; B23K 26/082;
(Continued)

(56) References Cited

U.S. PATENT DOCUMENTS 5,354,414 A 10/1994 Feygin
5,393,482 A * 2/1995 Benda ................... B22F 3/1055
264/40.1
(Continued)

FOREIGN PATENT DOCUMENTS

CN 1976800 A 6/2007
CN 101090787 A 12/2007
(Continued)

*Primary Examiner* — Xiao S Zhao
*Assistant Examiner* — Michael Robinson
(74) *Attorney, Agent, or Firm* — Novick, Kim & Lee, PLLC; Allen Xue

(57) ABSTRACT

An ultraviolet laser 3D printing device includes a thermostat, a laser head, a non-contact type temperature monitoring device, a scanning galvanometer, a processing platform, a powder laying device, a material to be processed, a computer control system. The device is configured to perform the following functions: presetting a processing temperature by the control system; during the processing procedure, the temperature rise condition of the processed object is monitored by the non-contact type temperature monitoring device and fed back in real time to the control system; and by recording the rise value of the temperature within a certain period, the system can obtain the absorption capability of the laser and the temperature rise degree of the processed material, so that the laser output power can be calculated according to the preset processing temperature value, and the laser power can be adjusted in real time to precisely control the processing temperature.

9 Claims, 2 Drawing Sheets

(51) Int. Cl.
| | | |
|---|---|---|
| *B23K 26/12* | (2014.01) | |
| *B33Y 30/00* | (2015.01) | |
| *B23K 103/00* | (2006.01) | |
| *B23K 26/064* | (2014.01) | |
| *B23K 26/06* | (2014.01) | |
| *B29C 64/282* | (2017.01) | |
| *B23K 26/342* | (2014.01) | |
| *B23K 26/354* | (2014.01) | |

(52) U.S. Cl.
CPC .......... *B23K 26/342* (2015.10); *B23K 26/354* (2015.10); *B29C 64/282* (2017.08); *B33Y 30/00* (2014.12); *B23K 2103/42* (2018.08)

(58) Field of Classification Search
CPC .. B23K 26/342; B23K 26/354; B23K 26/702; B23K 26/0608; B23K 26/083; B23K 26/12; B23K 26/127; B23K 2103/42; B29C 64/282; B29C 64/153
See application file for complete search history.

(56) References Cited

U.S. PATENT DOCUMENTS

| | | | | |
|---|---|---|---|---|
| 2003/0052105 | A1* | 3/2003 | Nagano | B23K 26/0604 219/121.83 |
| 2004/0200816 | A1 | 10/2004 | Chung et al. | |
| 2007/0196561 | A1* | 8/2007 | Philippi | B33Y 30/00 427/8 |
| 2008/0153947 | A1* | 6/2008 | Booth | C08K 5/02 524/81 |
| 2010/0203478 | A1* | 8/2010 | Rubbert | A61C 5/007 433/212.1 |
| 2012/0219249 | A1* | 8/2012 | Pitwon | G02B 6/138 385/14 |
| 2013/0154160 | A1* | 6/2013 | Cooper | B29C 64/135 264/401 |

FOREIGN PATENT DOCUMENTS

| | | |
|---|---|---|
| CN | 102199348 A | 9/2011 |
| CN | 104136149 A | 11/2014 |

* cited by examiner

ULTRAVIOLET LASER 3D PRINTING METHOD FOR PRECISE TEMPERATURE CONTROL OF POLYMER MATERIAL AND DEVICE THEREOF

TECHNICAL FIELD

The present disclosure belongs to the technical field of 3D printing, specifically to an ultraviolet (UV) laser 3D printing method for the precise temperature control of polymer material and device thereof.

BACKGROUND ART 3D printing, as a popular concept, is a kind of rapid prototyping technologies produced in the late 1980s. This technology, as the integration of mechanical engineering, material engineering, numerical control technology, laser technology and so on, manufactures prototype parts by material accumulation. The principle is to form a digital model by the modeling based on the computer aided design (CAD) or computer animation, resolve the 3D model into two-dimensional cross sections layer by layer, and then produce an entity product by accumulating and solidifying the printing material layer by layer with a software and a numerical control system. Primary methods include Stereo Lithography Apparatus (SLA), Laminated Object Manufacturing (LOM), Selective Laser Sintering (LS), Fused Deposition Modeling (FDM) and so on.

Compared with traditional manufacturing methods, 3D printing technology has the advantages comprising manufacture without being limited by the shape complexity of the product parts, rapid manufacture, feasibility for the synchronization of product design and mold production, improved research and development efficiency, shorten design cycle and high utilization rate (nearly 100%) of raw materials. Based on the above advantages, this technology has been widely applied in the fields such as automotive, household electrical appliances, communication, aviation, industrial modeling, medical treatment and archaeology.

The materials for 3D printing have been developed from the photosensitive resin, ABS, ABS classes, wax types, glass fiber and other plastic material, to stainless steel, aluminum alloy, iron nickel alloy, cobalt chromium molybdenum alloy and other metal materials. Although the material species have been richer than the past, a gap still exists as compared with the traditional materials used in manufacturing. Because some polymer materials have similar melting temperature and decomposition temperature, in order to avoid the change of the properties of the processed materials, the precise control of the processing temperature for improving the rate of finished products of the molding technology, has become an important technical problem to be solved.

UV laser has the advantages such as short wavelength, high resolution, concentrated energy focusing, stable pulse and high repetition frequency. Furthermore, it has the characteristic of "cold processing" which allows the direct destruction of the chemical bond of connecting material without producing external heat to periphery. Generally, the processes using ultraviolet laser could produce good finished surfaces, most of which do not have hot cracking and melting sediment, and have sharp and neat edges, refined microstructure, small and even negligible heat affected zone. Thus, the ultraviolet laser has become an ideal tool for processing fragile materials to obtain very high processing quality and dimensional precision. At the same time, since most materials, such as ceramics, metals, polymers, etc., could effectively absorb ultraviolet light, the ultraviolet laser has become an important band of 3D laser printing technology.

The patent application with the Publication Number of CN1135731 disclosed the method using a dual-beam laser to reduce material crimp caused by the excessive difference of temperature gradient. However, such laser needed a device with a complicated structure. Accordingly, the present disclosure provides a more simple method with lower cost for achieving even temperature gradient.

CONTENTS OF THE INVENTION

Aiming at the above problems existing in the prior 3D printing methods, the present disclosure provides an ultraviolet laser 3D printing method for the precise temperature control of polymer materials and device thereof to solve the above technical problems.

The invention solved the above problems by the following technical solutions.

An ultraviolet laser 3D printing device for the precise temperature control of polymer material, wherein the device comprises a thermostat for maintaining a constant temperature of working environment, and a processing platform for supporting the object to be formed is equipped in the thermostat;

a powder laying device capable of coating the polymer material on the platform is equipped on the processing platform, and a laser head capable of emitting a directional ultraviolet laser beam is equipped above the processing platform, wherein said ultraviolet laser beam can be deflected to the processing platform by a scanning galvanometer;

a non-contact type temperature monitoring device is equipped at a distance above the processing platform, and said temperature monitoring device is used to no-contact measure the temperature of the powder layer at the top of the processing platform;

said printing device also comprises a computer control system for both controlling and/or adjusting the power and running track of the laser head, and reading the temperature of the polymer material measured by the temperature monitoring device;

said computer control system is connected with the laser head and the temperature monitoring device to realize the closed loop control of the sintering temperature.

Preferably, the laser head adopts a dual-die structure, in which the inner die and the outer die are coaxially fixed, and one or more pieces of graduated neutral density filters are fixed between the two dies, in which the laser transmittance of said filter reduces along the axial direction from the inner die to the outer die. Preferably, the reduction is an even reduction.

Preferably, laser can emit from the inner die and the outer die respectively, wherein the laser from the outer die has a temperature lower than the processing temperature of the processed material.

Preferably, the laser head has a linearly adjustable power between 1 W and 100 W, a repetition frequency between 1 kHz and 100 kHz, a pulse width between 1 ps and 100 ns, and a wavelength between 190 nm and 380 nm.

Preferably, the non-contact type temperature monitoring device is controlled by a control system, and the probe of said non-contact type temperature monitoring device aims at the laser processing point.

Preferably, the temperature of the thermostat is between 20° C. and 30° C.

Preferably, the computer control system is used to control the laser output of the laser head, the scanning galvanometer scans the reflected laser beam, and the computer control system compares the temperature information feedback from the non-contact temperature monitoring device with the preset processing temperature, and then adjust the emissive energy of the laser head.

Preferably, the processing platform can move vertically in the vertical direction.

Preferably, the polymer material can be one or more materials selected from the group consisting of nylon 6 (PA6), nylon 12 (PA12), nylon 66 (PA66), poly(acrylonitrile-butadiene-styrene) (ABS), polystyrene (PS), polymethyl methacrylate (PMMA), polyethylene (PE), polypropylene (PP), polyoxymethylene (POM), polycarbonate (PC), polyvinyl chloride (PVC), polybutylene terephthalate (PBT), polyethylene terephthalate (PET), polyphenylene oxide (PPO), polylactic acid (PLA), poly(ether-ether-ketone) (PEEK), polyimide (PI) and mixtures thereof.

A 3D printing method using the above-mentioned printing device, comprising the following steps:

step 1: coating the polymer material onto the processing platform through the powder laying device;

step 2: according to a two-dimensional processing pattern provided by the computer control system, the scanning galvanometer deflects to a designated position, and the laser emits to process the first layer of the material;

step 3: ultraviolet light is irradiated by the ultraviolet laser pulse laser head on the polymer material;

during the processing, when the core temperature of the laser emitting from the laser head reaches the requirement of material processing, the processing temperature of the peripheral laser will be gradually reduced to prevent the material crimp caused by excessive temperature gradient;

the temperature rise condition of the processed object is monitored by the non-contact type temperature monitoring device and fed back in real time to the control system; and by recording the rise value of the temperature within a certain period, the system can obtain the absorption capability of the laser and the temperature rise degree of the processed material, so that the laser output power can be calculated according to the preset processing temperature value, and the laser power can be adjusted in real time to precisely control the processing temperature; the above-mentioned control logic can be operated during the processing procedure at preset intervals;

step 4: finishing the prototyping work of 2D cross sections at corresponding heights, and closing the temperature monitoring device and the laser head by the main control system;

step 5: reducing the height of the processing platform, laying the material powder on the powder bed so that the upper surface of the powder bed and the upper surface of the processing platform coincide again;

step 6: repeating the steps 2 to 5 until the integral prototyping of the project is finished;

step 7: taking out the project, removing excess powder, polishing and drying it to produce the final prototyped project.

According to the present invention, by recording the rise value of the temperature within a certain period, the computer control system can obtain the absorption capability of the laser and the temperature rise degree of the material to be processed. Therefore, the laser output power can be calculated according to the preset processing temperature value, and the laser power can be adjusted in real time to precisely control the processing temperature.

At the same time, the invention adopts a dual-die laser head, in which the inner die of the dual-die laser head can provide a laser beam that reaches the sintering temperature, and the outer die can provide a laser with reduced energy, which is attenuated by the graduated neutral density filter. Accordingly, the laser can has a temperature lower than the sintering temperature and evenly reduce along the axial direction from the inner die to the outer die, and the temperature gradient difference between the sintering region and the peripheral region, and thus can greatly reduce the possibility of the crimp of the sintered materials caused by the excessive temperature gradient. Furthermore, because the peripheral region of the sintering region has a temperature not reaching the sintering temperature point, the undesirable material sintering would not occur and thus unnecessary troubles can be avoided.

DESCRIPTION OF THE DRAWINGS

In FIG. 1, 1 represents the laser head, 2 represents the non-contact type temperature monitoring device, 3 represents the scanning galvanometer, 4 represents the scanning galvanometer, 5 represents the processing platform, 6 represents the powder laying device, 7 represents the processing material, 8 represents the thermostat, 9 represents the computer control system, 10 represents the laser beam, 11 represents the inner die, 12 represents the outer die, 121 represents the filter, 13 represents the fixed part, 111 represents the laser emitting from the inner die, and 122 represents the laser emitting from outer die.

EMBODIMENTS

In order to make the object, technical solutions and advantages of the present invention more clear and apparent, the present invention will be further described in detail hereinbelow with reference to the drawings and the following embodiments and examples.

Figure 1:
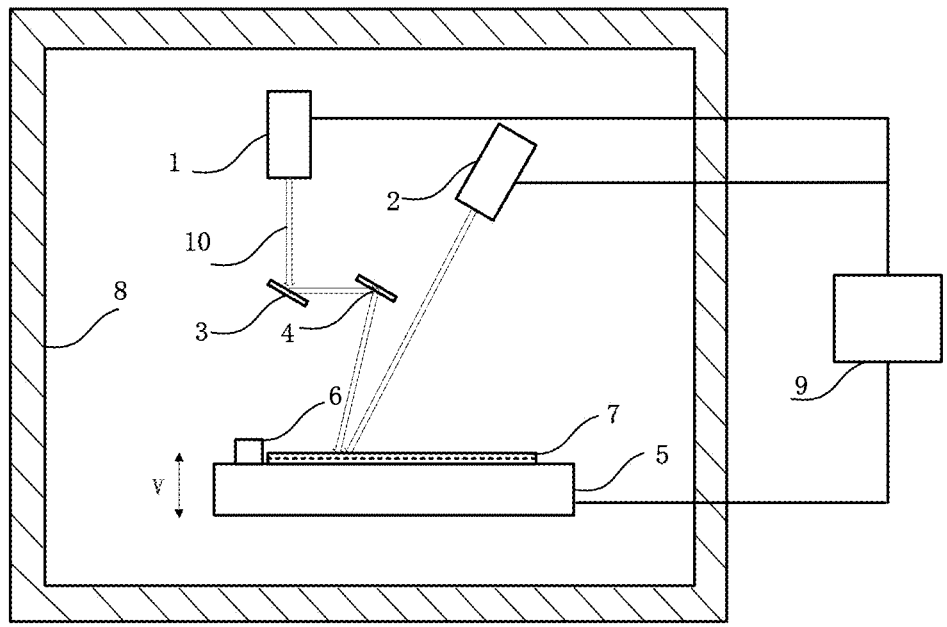
FIG. 1 is a schematic diagram of the ultraviolet laser 3D prototyping-printing device for the precise temperature control of polymer material according to the disclosure.
Figure 2:
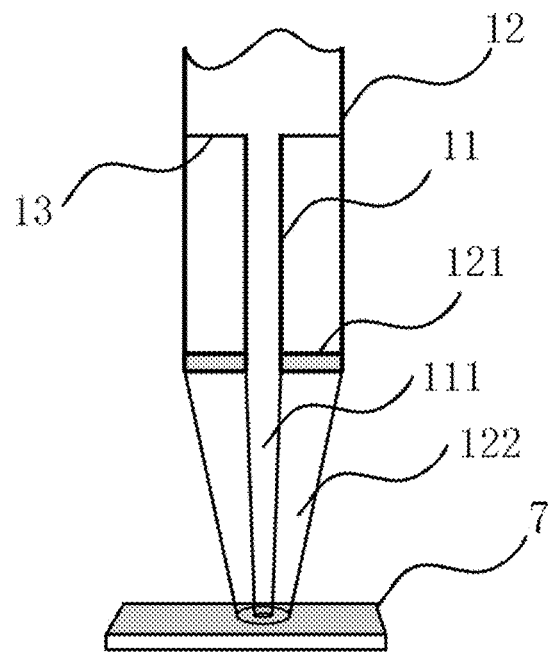
FIG. 2 is a diagram of the internal structure of the laser head.
Figure 3:
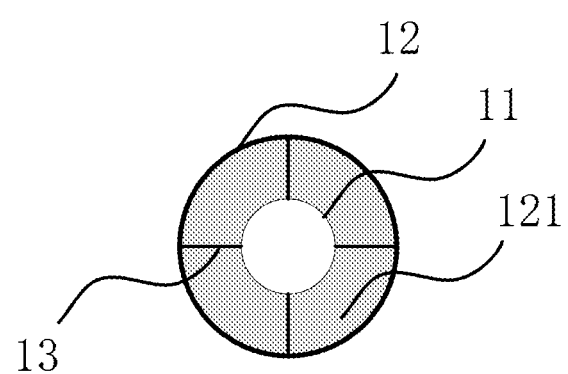
FIG. 3 is a diagram of the cross-section of the laser head.

The present invention provides an ultraviolet laser 3D printing device for the precise temperature control of polymer material. FIG. 1 shows a printing-prototyping apparatus as an example according to the present invention. Said printing-prototyping apparatus comprises a thermostat 8 for maintaining a constant temperature of working environment to reduce the influence of the change of process parameters caused by the change of ambient temperature; and the thermostat 8, for example, can be made of a ceramic material with good thermal insulation property. Preferably, the temperature range of the thermostat 8 is preferably 20 to 30 degrees Celsius. A processing platform 5 for supporting the object to be formed is equipped in the thermostat 8. Above the processing platform 5, a radiation device with a laser head 1 is equipped, wherein said radiation device can emit a directional ultraviolet laser beam 10. The laser beam 10 is deflected to the processing platform 5 through the two scanning galvanometer 3 and 4. As shown in FIGS. 2 and 3, the laser head 1 adopts a dual-die structure, in which the inner die 11 and the outer die 12 are coaxially fixed through the fixed piece 13, and one or more pieces of graduated neutral density filters 121 are fixed between the two dies. The laser transmittance of said filter 121 reduces (preferably evenly) along the axial direction from the inner die to the outer die. Laser 111 emits from the inner die and laser 122 emits from the outer die. The core temperature of the laser emitting from the inner die 11 of the laser head reaches the requirement of the material processing, and the processing temperature of the peripheral laser emitting from the outer die 12 is gradually reduced to prevent the material crimp caused by excessive temperature gradient. Furthermore, a powder laying device 6 used for coating the powder polymer materials to be consolidated onto the processing platform 5, wherein the powder laying device 6 can move back and forth on the processing platform 5 with the aid of a driving device.

A non-contact type temperature monitoring device 2 is equipped at a distance above the processing platform 5. Said temperature monitoring device is used to no-contact measure the temperature of the powder layer at the top of the processing platform. When the device is used, the probe of the non-contact type temperature monitoring device would aim at the processing position. At the time that the laser beam emits, the non-contact type temperature monitoring device starts to work, and the computer simultaneously displays the real-time temperature. According to the properties of the material to be processed, the processing temperature is preset. Furthermore, the output power of the laser and the repeat frequency parameter are analyzed and calculated by the computer control system. Subsequently, the laser head outputs laser, while both the non-contact type temperature monitoring device and the scanning galvanometer maintain a relatively constant position to monitor and feed back the temperature rise condition of the processing material under the laser irradiation in real time. By recording the rise value of the temperature within a certain period, the system obtains the absorption capability of the laser and the temperature rise degree of the processed material. By comparing the ideal preset temperature with the actual temperature of the processed project, the difference between the ideal temperature and the actual temperature is given, so that the laser output power and the repeat frequency is calculated. Thus, the laser parameters are adjusted to meet the requirements of the precise temperature control.

The computer control system 9 is used to control and/or adjust the power and running track of the laser head 1, and to read the temperature of the polymer material measured by the temperature monitoring device 2. Therefore, the computer control system is connected with the laser head 1 and the temperature monitoring device 2.

The laser head has a linearly adjustable power between 1 W and 100 W, the repetition frequency is between 1 kHz and 100 kHz, the pulse width is between 1 ps and 100 ns, and the wavelength is between 190 nm and 380 nm.

The operation of the above printing-prototyping device will be illustrated by way of the example of ultraviolet laser 3D printing using the specific polymeric material of polyimide (PI).

The material to be processed is polyimide, which has the processing temperature range of 340 to 400° C., the thermal conductivity of 0.1 to 0.5 w/m·K, the heat capacity of 1.09 kJ/(kg*K), the proportion of 1.3 g/cm$^3$, and the layer thickness of 0.1 mm.

The laser head has the following parameters: the output wavelength of 355 nm, the pulse width of 10 ns, the continuous adjustable power of 1 to 100 W, the repetition frequency of 10 kHz, the spot diameter of 0.3 mm. The scanning speed of the galvanometer is 0.1 m/s.

The temperature of the thermostat is 25° C.

The preset processing temperature is 360° C. The preliminarily estimated laser power is 60 W.

Step 1

Coating polyimide materials on the processing platform through the powder laying device 6.

Step 2

According to a two-dimensional processing pattern provided by the computer control system, the scanning galvanometer deflected to a designated position, and the laser emitted to process the first layer of the material.

Step 3

Ultraviolet light 10 was irradiated by ultraviolet laser pulse head 2 on the polyimide material 7. Laser 111 emitted from the inner die and laser 122 emitted from the outer die. The core temperature of the laser emitting from the inner die 11 of the laser head reached the requirement of the material processing, and the processing temperature of the peripheral laser emitting from the outer die 12 was gradually reduced to prevent the material crimp caused by excessive temperature gradient. The temperature rise condition of the processed object was monitored by the non-contact type temperature monitoring device 2 and fed back in real time to the control system. By recording the rise value of the temperature within a certain period, the system obtained the absorption capability of the laser and the temperature rise degree of the processed material, so that the laser output power was calculated according to the preset processing temperature value, and the laser power was adjusted in real time to precisely control the processing temperature. Specifically, when the monitored temperature rose at a rate of 5° C./s or more, the main control system decreased the output power of the laser head 1 by one level (the expression "decreased the output power of the laser head 1 by one level" refers to the output power of the radiation device in the form of the laser head was decreased by one level from the preset output power), and raised the scanning speed of the laser head by 5%. Moreover, when the monitored temperature rose at a rate of 3 to 5° C./s, the main control system decreased the output power of the laser head 1 by one level; when the monitored temperature rose at a rate of 0.5 to 3° C./s, the main control system raised the scanning speed of laser head by 5%; and when the monitored temperature rose at a rate of 0 to 0.5° C./s, the main control system maintained the process operation parameters unchanged. The above-mentioned control logic can be operated during the processing procedure at preset intervals.

Step 4

Finishing the prototyping work of 2D cross sections at corresponding heights, and closing the temperature monitoring device 2 and the laser head 1 successively by the main control system 9.

Step 5

Reducing the height of the processing platform 5 and in succession the position of the powder bed, and laying the material powder on the powder bed so that the upper surface of the powder bed and the upper surface of the processing platform coincide again.

Step 6

Repeating the steps 2 to 5 until the integral prototyping of the project was finished.

Step 7

Taking out the project, removing excess powder, polishing and drying it to produce the final prototyped project.

The invention adopted a dual-die laser head, in which the inner die of the dual-die laser head provided a laser beam that reached the sintering temperature, and the outer die provided a laser with reduced energy, which was attenuated by the graduated neutral density filter. Accordingly, the laser had a temperature lower than the sintering temperature and would evenly reduce along the axial direction from the inner die to the outer die, and the temperature gradient difference between the sintering region and the peripheral region, and thus greatly reduced the possibility of the crimp of the sintered materials caused by the excessive temperature gradient. Furthermore, because the peripheral region of the sintering region had a temperature not reaching the sintering temperature point, the undesirable material sintering would not occur and thus unnecessary troubles were avoided.

It should be understand that the embodiments according to the present disclosure cannot be limited to radiation of the laser processing die on the surface of the powder bed to melt the powder. Various raw materials capable of forming solid after phase transition can be applied in the present invention. For example, the raw materials can be one or more materials selected from the group consisting of nylon 6 (PA6), nylon 12 (PA12), nylon 66 (PA66), acrylonitrile-butadiene-styrene (ABS), polystyrene (PS), polymethyl methacrylate (PMMA), polyethylene (PE), polypropylene (PP), polyoxymethylene (POM), polycarbonate (PC), polyvinyl chloride (PVC), polybutylene terephthalate (PBT), polyethylene terephthalate (PET), polyphenylene oxide (PPO), polylactic acid (PLA), poly-ether-ether-ketone (PEEK), polyimide (PI) and mixtures thereof.

The invention claimed is:

1. An ultraviolet laser 3D printing device, comprising:
   a thermostatic chamber for maintaining a constant temperature;
   a processing platform disposed in the thermostatic chamber for supporting an object being printed;
   a powder laying device for applying a polymer material on the processing platform;
   a laser head disposed above the processing platform for emitting a laser beam;
   a scanning galvanometer that deflects the laser beam onto the processing platform;
   a non-contact type temperature monitoring device disposed at a distance above the processing platform;
   a computer control system coupled to the laser head and the temperature monitoring device for controlling a power and a movement trajectory of the laser head, and for receiving a temperature signal from the temperature monitoring device,
   wherein the laser head comprises an inner die and an outer die coaxially disposed in the laser head, and one or more pieces of graded filters are disposed in a gap between the inner die and the outer die, and wherein a laser transmittance of each of the one or more pieces of graded filters reduces in a radial direction from the inner die to the outer die,
   wherein the laser beam is ultraviolet laser having a wavelength of 190 nm to 380 nm, and
   wherein the laser beam comprises a core laser beam emitted from the inner die and a peripheral beam emitted from the outer die.

2. The printing device according to claim 1, wherein the laser head has a linearly adjustable power between 1 W and 100 W, a repetition frequency between 1 kHz and 100 kHz, and a pulse width between 1 ps and 100 ns.

3. The printing device according to claim 1, wherein a probe of said non-contact type temperature monitoring device is controlled by the control system to aim at the laser processing point.

4. The printing device according to claim 1, wherein the temperature of the thermostatic chamber is controlled at a temperature between 20° C. and 30° C.

5. The printing device according to claim 1, wherein the polymer material is selected from the group consisting of nylon 6 (PA6), nylon 12 (PA12), nylon 66 (PA66), poly (acrylonitrile-butadiene-styrene) (ABS), polystyrene (PS), polymethyl methacrylate (PMMA), polyethylene (PE), polypropylene (PP), polyoxymethylene (POM), polycarbonate (PC), polyvinyl chloride (PVC), polybutylene terephthalate (PBT), polyethylene terephthalate (PET), polyphenylene oxide (PPO), polylactic acid (PLA), poly(ether-ether-ketone) (PEEK), polyimide (PI), and mixtures thereof.

6. A 3D printing method for printing an object using the printing device of claim 1, comprising the following steps:
   step 1: coating the polymer material onto the processing platform using the powder laying device;
   step 2: according to a two-dimensional processing pattern provided by the computer control system, the scanning galvanometer deflects to a designated position, and the laser emits to process a first layer of the material;
   step 3: irradiating the polymer material using the laser beam;
   monitoring the temperature of the object being printed using the non-contact type temperature monitoring device and sending the temperature to the control system; and
   adjusting the power of the laser beam in real time to control the temperature of the object being printed;
   step 4: turning off the temperature monitoring device and the laser head by the control system after finishing processing on the first layer of polymer material;
   step 5: reducing a height of the processing platform, laying the polymer material on the powder bed so that the upper surface of the powder bed and the upper surface of the processing platform coincide again;
   step 6: repeating the steps 2 to 5 until the object is printed;
   step 7: removing the printed object from the thermostatic chamber.

7. The method according to claim 6, wherein in said step 3,
   when the monitored temperature rises at a rate of 5° C./s or higher, the control system decreases the power of the laser head by one level, and raise the scanning speed of the laser head by 5%;
   when the monitored temperature rises at a rate of 3 to 5° C./s, the control system decreases the power of the laser head by one level;
   when the monitored temperature rises at a rate of 0.5 to 3° C./s, the control system raises the scanning speed of laser head by 5%; and
   when the monitored temperature rises at a rate of 0 to 0.5° C./s, the control system maintains the process operation parameters unchanged.

8. The printing device according to claim 4, wherein the computer control system controls the power of the laser head, the scanning galvanometer scans the reflected laser beam, and the computer control system compares the temperature information feedback from the non-contact temperature monitoring device with the preset processing temperature, and then adjusts the power of the laser head.

9. The printing device according to claim 4, wherein the processing platform is configured to move in the vertical direction.

* * * * *